(12) United States Patent
Leinweber et al.

(10) Patent No.: US 7,615,102 B2
(45) Date of Patent: Nov. 10, 2009

(54) CORROSION AND GAS HYDRATE INHIBITORS WITH AN INCREASED BIOLOGICAL DEGRADABILITY AND A REDUCED TOXICITY

(75) Inventors: Dirk Leinweber, Schwalbach (DE); Michael Feustel, Koengernheim (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 390 days.

(21) Appl. No.: 11/664,861

(22) PCT Filed: Sep. 28, 2005

(86) PCT No.: PCT/EP2005/010503

§ 371 (c)(1), (2), (4) Date: Apr. 5, 2007

(87) PCT Pub. No.: WO2006/040013

PCT Pub. Date: Apr. 20, 2006

(65) Prior Publication Data

US 2009/0173663 A1 Jul. 9, 2009

(30) Foreign Application Priority Data

Oct. 7, 2004 (DE) ........................ 10 2004 048 778

(51) Int. Cl.
B01D 47/00 (2006.01)
(52) U.S. Cl. .................. 95/153; 252/387; 252/390; 252/392; 252/396; 507/90; 507/939; 585/15
(58) Field of Classification Search .................. 507/90; 95/153; 252/390–399
See application file for complete search history.

(56) References Cited

U.S. PATENT DOCUMENTS

| | | | |
|---|---|---|---|
| 4,481,125 A | 11/1984 | Holgado | |
| 4,730,079 A | 3/1988 | Hofinger | |
| 4,767,551 A | 8/1988 | Hunt | |
| 4,997,912 A | 3/1991 | Wirtz | |
| 5,135,668 A | 8/1992 | Larsen | |
| 5,432,292 A | 7/1995 | Sloan | |
| 5,460,728 A | 10/1995 | Klomp | |
| 5,600,044 A | 2/1997 | Colle | |
| 5,648,575 A | 7/1997 | Klomp | |
| 5,874,660 A | 2/1999 | Colle | |
| 5,879,561 A | 3/1999 | Klomp | |
| 6,025,302 A | 2/2000 | Pakulski | |
| 6,063,146 A | 5/2000 | Miller et al. | |
| 6,102,986 A | 8/2000 | Klug | |
| 6,152,993 A | 11/2000 | Klomp | |
| 6,177,497 B1 | 1/2001 | Klug | |
| 6,214,091 B1 | 4/2001 | Klomp | |
| 6,261,346 B1 | 7/2001 | Breuer | |
| 6,369,004 B1 | 4/2002 | Klug | |
| 6,372,918 B1 | 4/2002 | Feustel | |
| 6,379,294 B1 | 4/2002 | Buijs | |
| 6,444,852 B1 | 9/2002 | Milburn | |
| 6,566,309 B1 | 5/2003 | Klug | |
| 6,596,911 B2 | 7/2003 | Przybylins | |
| 6,894,007 B2 | 5/2005 | Klug | |
| 7,160,507 B2 | 1/2007 | Dahlmann | |
| 7,183,240 B2 | 2/2007 | Dahlmann | |
| 7,214,814 B2 | 5/2007 | Dahlmann | |
| 2003/0013614 A1 | 1/2003 | Klug | |
| 2004/0030206 A1 | 2/2004 | Dahlmann | |
| 2004/0163306 A1* | 8/2004 | Dahlmann et al. | ............ 44/405 |
| 2004/0163307 A1 | 8/2004 | Dahlmann | |
| 2004/0164278 A1 | 8/2004 | Dahlmann | |
| 2005/0101495 A1 | 5/2005 | Dahlmann | |

FOREIGN PATENT DOCUMENTS

DE 19920152 10/2000

(Continued)

OTHER PUBLICATIONS

Int'l Prelim. Report on Patentability for corresponding application PCT/EP2005/010503, mailed Apr. 24, 2007.

(Continued)

*Primary Examiner*—Robert J Hill, Jr.
*Assistant Examiner*—Brian McCaig
(74) *Attorney, Agent, or Firm*—Tod A. Waldrop; Richard P. Silverman

(57) ABSTRACT

The invention relates to the use of compounds of formula (1) as corrosion and gas hydrate inhibitors. In said formula: $R^1$ and $R^2$ independently of one another represent $C_1$ to $C_{22}$ alkyl, $C_2$ to $C_{22}$ alkenyl, $C_6$ to $C_{30}$ aryl or $C_7$ to $C_{30}$ alkyl aryl; $R^3$ represents M, hydrogen or an organic group with between 1 and 100 carbon atoms that optionally contains heteroatoms; A represents a $C_2$ to $C_4$ alkene group; B represents an optionally substituted $C_1$ to $C_{10}$ alkene group; D represents an ethylene group that is substituted with an organic group comprising between 1 and 600 carbon atoms; X and Y independently of one another represent O or $NR^4$; $R^4$ represents hydrogen, $C_1$ to $C_{22}$ alkyl, $C_2$ to $C_{22}$ alkenyl, $C_6$ to $C_{30}$ aryl or $C_7$ to $C_{30}$ alkyl aryl; M represents a cation; and n represents a number between 0 and 30.

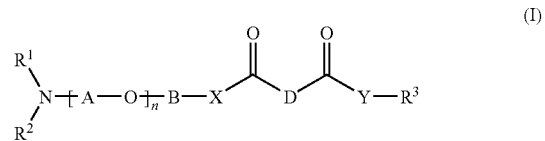

13 Claims, No Drawings

FOREIGN PATENT DOCUMENTS

| | | |
|---|---|---|
| DE | 19930683 | 1/2001 |
| DE | 10059816 | 4/2002 |
| DE | 10114638 | 5/2002 |
| EP | 0212265 | 3/1987 |
| EP | 0320769 | 6/1989 |
| EP | 0359048 | 3/1990 |
| EP | 0148215 | 1/1991 |
| EP | 0446616 | 9/1991 |
| EP | 0736130 | 10/1996 |
| EP | 0824631 | 2/1998 |
| EP | 9823843 | 6/1998 |
| EP | 0914407 | 5/1999 |
| EP | 0946788 | 10/1999 |
| EP | 1449940 | 8/2004 |
| EP | 1450003 | 8/2004 |
| EP | 1450004 | 8/2004 |
| WO | 9412761 | 6/1994 |
| WO | 9608672 | 3/1996 |
| WO | 9641785 | 12/1996 |
| WO | 9823792 | 6/1998 |
| WO | 9913197 | 3/1999 |
| WO | 0078706 | 12/2000 |
| WO | 0109082 | 2/2001 |

OTHER PUBLICATIONS

Co-pending U.S. Appl. No. 11/729,411, filed Mar. 28, 2007, as a Div of US Pat. No. 7,214,814, issued May 18, 2007 and published as US 2007-0173672 on Jul. 26, 2007.

International Search Report for corresponding application PCT/EP/2005/010503, mailed Feb. 15, 2006.

English language Abstract and machine translation of EP 0359048, Published Mar. 21, 1990.

* cited by examiner

CORROSION AND GAS HYDRATE INHIBITORS WITH AN INCREASED BIOLOGICAL DEGRADABILITY AND A REDUCED TOXICITY

The present invention relates to a process for corrosion inhibition and gas hydrate inhibition on and in equipment for extracting and transporting hydrocarbons in crude oil extraction and processing.

In industrial processes in which metals come into contact with water or else with oil-water biphasic systems, there is the risk of corrosion. This is particularly marked when the aqueous phase, as in the case of crude oil extraction and refining processes, has a high salt content or is acidic as a result of dissolved acidic gases such as carbon dioxide or hydrogen sulfide. Therefore, the exploitation of a deposit and the processing of crude oil is not possible without specific additives for the protection of the equipment used.

Suitable corrosion protectants for crude oil extraction and processing have already been known for some time, but will become unacceptable in the future for reasons of environmental protection for offshore applications.

As typical prior art corrosion inhibitors, amides, amido amines and imidazolines of fatty acids and polyamines have extremely good oil solubility and are thus present in the corrosive water phase only in a low concentration owing to poor partitioning equilibria. Accordingly, these products have to be used in a high dose in spite of their poor biodegradability.

Quaternary alkylammonium compounds (quats) are alternative prior art corrosion protectants which, in addition to the corrosion-inhibiting properties, may also have biostatic properties. In spite of an improved water solubility, the quats, for example in comparison to the imidazolines, have significantly reduced film persistence and therefore likewise lead to effective corrosion protection only in relatively high dosage. The high algae toxicity and the moderate biodegradability are restricting the use of quats ever more to ecologically insensitive fields of use.

Gas hydrates are crystalline inclusion compounds of gas molecules in water, which form under certain temperature and pressure conditions (low temperature and high pressure). As they are formed, the water molecules form cage structures around the particular gas molecules. The lattice formed from the water molecules is thermodynamically unstable and is only stabilized by the incorporation of guest molecules. These ice-like compounds can, depending on the pressure and gas composition, also exist over and above the freezing point of water (up to above 25° C.).

In the mineral oil and natural gas industry, especially the gas hydrates which form from water and the natural gas constituents methane, ethane, propane, isobutane, n-butane, nitrogen, carbon dioxide and hydrogen sulfide are of great significance. Especially in modern natural gas extraction, the existence of these gas hydrates constitutes a great problem, particularly when wet gas or multiphasic mixtures of water, gas and alkane mixtures are exposed to low temperatures under high pressure. Here, the formation of the gas hydrates, owing to their insolubility and crystalline structure, leads to the blockage of a wide variety of extraction equipment, such as pipelines, valves or production equipment, in which wet gas or multiphase mixtures are transported over relatively long distances at low temperatures, as occurs especially in relatively cold regions of the earth or on the sea bed.

Moreover, gas hydrate formation can also lead to problems in the course of the drilling operation for the development of new gas or mineral oil deposits under appropriate pressure and temperature conditions by the formation of gas hydrates in the drilling fluids.

In order to avoid such problems, the gas hydrate formation in gas pipelines, in the course of transport of multiphase mixtures or in drilling fluids can be suppressed by using relatively large amounts (more than 10% by weight based on the weight of the water phase) of lower alcohols such as methanol, glycol, or diethylene glycol. The addition of these additives has the effect that the thermodynamic limit of gas hydrate formation is shifted toward lower temperatures and higher pressures (thermodynamic inhibition). However, the addition of these thermodynamic inhibitors causes greater safety problems (flashpoint and toxicity of the alcohols), logistical problems (large storage tanks, recycling of these solvents) and accordingly high costs, especially in offshore extraction.

Nowadays, attempts are therefore being made to replace thermodynamic inhibitors by adding, in temperature and pressure ranges in which gas hydrates can form, additives in amounts of <2% which either delay gas hydrate formation (kinetic inhibitors) or keep the gas hydrate agglomerates small and hence pumpable, so that they can be transported through the pipeline (so-called agglomerate inhibitors or anti-agglomerates). The inhibitors used either prevent nucleation and/or the growth of the gas hydrate particles, or modify the hydrate growth in such a way that smaller hydrate particles result.

The gas hydrate inhibitors described in the patent literature, in addition to the known thermodynamic inhibitors, are a multitude of monomeric and polymeric substance classes which are kinetic inhibitors or agglomerate inhibitors. Of particular significance in this context are polymers which have a carbon backbone and contain, in the side groups, both cyclic (pyrrolidone or caprolactam radicals) and acyclic amide structures.

DE-A-103 07 728 discloses quaternary alkylalkoxyaminoalkyl esters and quaternary alkylaminoalkylamides of alkenylsuccinic acids as corrosion inhibitors and gas hydrate inhibitors.

DE-A-103 07 727 discloses quaternary alkylaminoalkyl esters and quaternary alkylalkoxyaminoalkylamides of alkenylsuccinic acids as corrosion inhibitors and gas hydrate inhibitors.

However, a disadvantage of these compounds is that their biodegradability is still insufficient.

It was an object of the present invention to find new corrosion inhibitors which, with constantly good or improved corrosion protection, also offer improved biodegradability in comparison to the prior art corrosion inhibitors in addition to good water solubility, rapid film formation and hence good film persistence. Moreover, the toxicity of the compounds shall be reduced by avoiding quat structures (quaternary ammonium cations).

It was a further object of the present invention to find improved additives which both slow the formation of gas hydrates (kinetic inhibitors) and keep gas hydrate agglomerates small and pumpable (antiagglomerates), in order to ensure a broad use spectrum with high potential action. In addition, it should be possible to replace the currently used thermodynamic inhibitors (methanol and glycols), which cause considerable safety problems and logistical problems.

Prior art gas hydrate inhibitors are commonly coadditized with corrosion inhibitors in order to prevent corrosion of the transport and extraction equipment. Owing to the frequent lack of immediate compatibility of gas hydrate inhibitor and corrosion protectant in the formulation, this gives rise to additional work for the user. It would be a significant advantage over the prior art if coadditization with corrosion inhibitors is no longer absolutely necessary.

It has now been found that, surprisingly, alkylaminoalkyl/alkoxy esters and alkylaminoalkyl/alkoxy amides, if appropriate containing alkylaminoalkyl/alkoxy imides, of alkenylsuccinic acids without quaternary ammonium structural elements exhibit excellent action as corrosion inhibitors and gas hydrate inhibitors, and also good biodegradability and reduced toxicity.

The invention thus provides for the use of compounds of the formula (1)

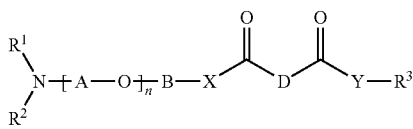

(1)

in which $R^1$, $R^2$ are each independently $C_1$- to $C_{22}$-alkyl, $C_2$- to $C_{22}$-alkenyl, $C_6$- to $C_{30}$-aryl or $C_7$- to $C_{30}$-alkylaryl, and $R^3$ is M, hydrogen or an organic radical which may contain heteroatoms and has from 1 to 100 carbon atoms, A is a $C_2$- to $C_4$-alkylene group, B is an optionally substituted $C_1$- to $C_{10}$-alkylene group, D is an ethylene group substituted by an organic radical having from 1 to 600 carbon atoms, X, Y are each independently O or $NR^4$, $R^4$ are each independently hydrogen, $C_1$- to $C_{22}$-alkyl, $C_2$- to $C_{22}$-alkenyl, $C_6$- to $C_{30}$-aryl or $C_7$- to $C_{30}$-alkylaryl, and M is a cation, n is from 0 to 30 as corrosion and gas hydrate inhibitors.

The invention further provides a process for inhibiting corrosion on metal surfaces, especially of ferrous metals, by adding at least one compound of the formula (1) to a corrosive system which is in contact with the metal surfaces.

The invention further provides a process for inhibiting gas hydrates by adding at least one compound of the formula (1) to a system which is composed of water and hydrocarbons and tends to form gas hydrates.

Corrosive systems in the context of this invention are preferably liquid/liquid or liquid/gaseous multiphasic systems consisting of water and hydrocarbons, which comprise corrosive constituents such as salts and acids in free and/or dissolved form. The corrosive constituents may also be gaseous, for instance hydrogen sulfide and carbon dioxide.

Hydrocarbons in the context of this invention are organic compounds which are constituents of mineral oil/natural gas, and their conversion products. Hydrocarbons in the context of this invention are also volatile hydrocarbons, for example methane, ethane, propane, butane. For the purposes of this invention, they also include the further gaseous constituents of crude oil/natural gas, for instance hydrogen sulfide and carbon dioxide.

A may be straight-chain or branched and is preferably an ethylene, propylene or butylene group, especially an ethylene or propylene group. The alkoxy groups designated by $(A-O)_n$ may also be mixed alkoxy groups.

B may be straight-chain or branched and is preferably a $C_2$- to $C_4$-alkylene group, especially an ethylene or propylene group. B may optionally be substituted by functional groups, preferably by one or more OH groups.

$R^1$ and $R^2$ are preferably each independently an alkyl or alkenyl group of from 2 to 14 carbon atoms, in particular those groups having from 3 to 8 carbon atoms and especially butyl groups.

$R^4$ is preferably hydrogen.

$R^3$ may be any organic radical which contains from 1 to 100 carbon atoms and may optionally contain heteroatoms. When $R^4$ contains heteroatoms, they are preferably nitrogen or oxygen atoms or both, preferably both.

$R^3$ is preferably a radical of the formula (2)

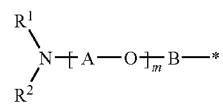

(2)

in which $R^1$, $R^2$, A and B are each as defined above with the areas of preference specified above in each case for $R^1$, $R^2$, A and B.

m, independently of n, is from 0 to 30, preferably from 1 to 10 and more preferably from 2 to 6.

In a further preferred embodiment, $R^3$ includes hydrogen which may be present either in covalently bonded or dissociated form.

D, together with the carbonyl groups to which it is bonded, forms a substituted succinic acid derivative. D is therefore a structural unit of the formula

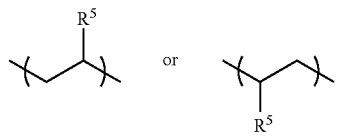

in which $R^5$ is any organic radical which may contain heteroatoms and has from 1 to 600 carbon atoms, in particular $C_2$- to $C_{100}$-alkyl or alkenyl radicals. The alkenyl radicals $R^5$ may be derived from $C_2$- to $C_8$-alkenes by oligomerization, especially from ethylene, propylene or butylene.

When $R^5$ comprises heteroatoms, they are preferably nitrogen or oxygen atoms or both, preferably both.

$R^5$ preferably contains structural units of the formula (3)

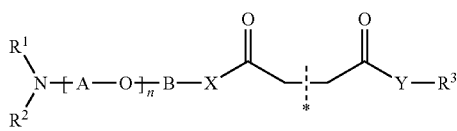

(3)

in which $R^1$, $R^2$, $R^3$, B, X and Y are each as defined above with the areas of preference specified above in each case for $R^1$, $R^2$, $R^3$, B, X and Y. The broken line means that the structural units of the formula (3) may be bonded either in the 2- or in the 3-position of the dicarbonyl group via a valence of an alkyl or alkenyl radical at any position of $R^5$.

M is a mono- or polyvalent cation, preferably metal ion, more preferably alkali metal or alkaline earth metal ions.

In a further preferred embodiment, M is an ammonium ion of the formula $N^+HR^6R^7R^8$, in which $R^6$, $R^7$ and $R^8$ are each independently hydrogen or any organic radical which contains from 1 to 100 carbon atoms and which may optionally contain heteroatoms. When $R^6$, $R^7$ and/or $R^8$ contain heteroatoms, they are preferably nitrogen or oxygen atoms or both, preferably both. In a particularly preferred embodiment, one, two or all $R^6$, $R^7$ and $R^8$ radicals are —$CH_2$—$CH_2$—OH, and the remaining radicals are each H. These cations M are consequently derived from mono-, di- or triethanolamine by protonation.

The inventive compounds may be used alone or in combination with other known corrosion inhibitors and/or gas hydrate inhibitors. In general, a sufficient amount of the inventive corrosion inhibitor and/or gas hydrate inhibitor will be used that sufficient corrosion protection and protection from gas hydrate formation are obtained under the given conditions.

Preferred use concentrations of the corrosion inhibitors, based on the pure inventive compounds, are from 5 to 5000 ppm, preferably from 10 to 1000 ppm, in particular from 15 to 150 ppm.

The gas hydrate inhibitors are generally used in amounts between 0.01 and 5% by weight of the pure inventive compounds based on the aqueous phase, preferably between 0.05 and 2% by weight.

Particularly suitable corrosion inhibitors and/or gas hydrate inhibitors are also mixtures of the inventive products with other prior art corrosion inhibitors and/or gas hydrate inhibitors.

Particularly suitable corrosion inhibitors and hence a preferred embodiment of this invention are mixtures of the compounds of the formula (1) to (3), such as with amido amines and/or imidazolines formed from fatty acids and polyamines and salts thereof, quaternary ammonium salts, oxyethylated/oxypropylated amines, amphoglycinates and -propionates, betaines or compounds described in DE-A-199 30 683.

Particularly suitable gas hydrate inhibitors and hence a preferred embodiment of this invention are mixtures of the compounds of the formula (1) to (3) with one or more polymers having a carbon backbone obtained by polymerization and amide bonds in the side chains. These include particularly homopolymers and/or copolymers of vinylpyrrolidone, vinylcaprolactam, isopropylacrylamide, acryloylpyrrolidine, N-methyl-N-vinylacetamide and further anionic, cationic and uncharged comonomers with vinylic double bond.

When mixtures are used, the concentration ratios between the inventive gas hydrate inhibitors and the added components are from 90:10 to 10:90 percent by weight; preference is given to using mixtures in the ratios of from 75:25 to 25:75 and in particular of from 60:40 to 40:60.

The inventive compounds can be prepared by reacting alkoxylated alkylamines, alkylaminoalkyleneamines or else alkylaminoalkyl ether amines with dicarboxylic acid derivatives to give the corresponding mono- or dicarboxylic esters or mono- or dicarboxamides, if appropriate to give cyclic dicarboximides according to the reaction ratios.

The preparation of alkoxylated alkylamines, alkylaminoalkyleneamines or else alkylaminoalkyl ether amines is described in the prior art.

The basis of the alkoxylated alkylamines used is dialkylamines having $C_1$- to $C_{22}$-alkyl radicals or $C_2$- to $C_{22}$-alkenyl radicals, preferably $C_3$- to $C_8$-dialkylamines. Suitable dialkylamines are, for example, di-n-butylamine, diisobutylamine, dipentylamine, dihexylamine, dioctylamine, dicyclopentylamine, dicyclohexylamine, diphenylamine, dibenzylamine.

The alkylamines are reacted generally with ethylene oxide, propylene oxide, butylene oxide or mixtures of different such alkylene oxides, preference being given to ethylene oxide or mixtures of ethylene oxide and propylene oxide. Based on the alkylamines, 1-30 mol of alkylene oxide are introduced, preferably 1-10 mol, more preferably 2-6 mol.

The alkoxylation is effected in bulk, but can also be effected in solution. Suitable solvents for the alkoxylation are inert ethers such as dioxane, tetrahydrofuran, glyme, diglyme and MPEGs.

In general, the alkoxylation in the first reaction step is performed uncatalyzed up to >95% by weight of tert-nitrogen. Higher alkoxylation is effected after addition of basic compounds as catalysts. The basic compounds used may be alkaline earth metal/alkali metal hydroxides or alkoxides (sodium methoxide, sodium ethoxide, potassium tert-butoxide), but preference is given to alkali metal hydroxides, particularly sodium hydroxide or potassium hydroxide.

The basis of the alkylaminoalkyleneamines used is essentially dialkylaminoalkyleneamines having $C_1$- to $C_{22}$-alkyl radicals or $C_2$- to $C_{22}$-alkenyl radicals, preferably tertiary $C_1$- to $C_8$-dialkylaminoalkyleneamines. Particularly suitable examples are N,N-dibutylaminopropylamine, N,N-diethylaminopropylamine, N,N-dimethylaminopropylamine, N,N-dimethylaminobutylamine, N,N-dimethylaminohexylamine, N,N-dimethylaminodecylamine, N,N-dibutylaminbethylamine and N,N-dimethylamino-2-hydroxypropylamine.

The basis of the dicarboxylic acid derivatives used are free dicarboxylic acids, dicarboxylic diesters, dicarboxylic anhydrides and dicarbonyl halides, preferably diesters and anhydrides. Particularly suitable are anhydrides, for example maleic anhydride, succinic anhydride, phthalic anhydride and alkenylsuccinic anhydrides.

The preparation of alkenylsuccinic anhydrides by thermal or catalyzed "ene" reaction is described in the prior art. In this reaction, olefins, preferably olefins with a terminal double bond, are reacted with maleic anhydride under elevated temperatures. Depending on the reaction, on the type of olefin used and on the molar ratio used, mono- and/or bisadducts, if appropriate polyadducts, are obtained.

The dicarboxylic acid derivatives are generally reacted with the alkoxylated alkylamines or alkylaminoalkyleneamines at 60-240° C., preferably at 120-200° C., in such a way that, if appropriate depending on the dicarboxylic acid derivative used, with elimination of water of reaction or of alcohol, complete condensation to the corresponding mono- or dicarboxylic esters or mono- or dicarboxamides, if appropriate to cyclic dicarboximides, is effected. The degree of conversion can be monitored by determining the acid number, hydrolysis number, and/or by determining the base and/or amide nitrogen.

The reaction is effected in bulk, but can preferably also be performed in solution. Especially in the case of use of carboxylic acids, the use of solvents is required when high conversions and relatively low acid numbers are desired from the resulting reaction products. Suitable solvents for the preparation are organic compounds through which the water of reaction is removed azeotropically. In particular, aromatic solvents or solvent mixtures, or alcohols can be used. Particular preference is given to 2-ethylhexanol. The reaction is then effected at the boiling point of the azeotrope.

In the case of preparation of dicarboxamides, preference is given to using dicarboxylic diesters and an excess of the corresponding amine, which can be removed by distillation with the alcohol released or after the reaction. When dicarboxylic anhydrides are used, preference is given to iteratively esterifying fully with a suitable alcohol and then amidating. Suitable alcohols are, for example, ethanol, propanol, isopropanol or 2-ethylhexanol. Particular preference is given to 2-ethylhexanol.

According to the prior art, the esterifications and amidations can be accelerated by adding suitable acidic catalysts having a $pK_a$ of less than or equal to 5, for example mineral acids or sulfonic acids. Particular preference is given to alkylstannic acids.

EXAMPLES

The abbreviations used are defined as follows:

| | |
|---|---|
| HN = | hydrolysis number |
| AN = | acid number |
| OHN = | OH number |
| bas. N = | basic nitrogen | a) General Method for the Preparation of the Alkylaminoalkyl/alkoxy Monoesters from Dicarboxylic Anhydrides A stirred apparatus with reflux condenser is initially charged with 1 mol of the appropriate anhydride (according to hydrolysis number) with nitrogen purging, and heated to 60° C. 1 Mol of the appropriate alkoxylated alkylenediamine (according to OH number or bas. N) is then added dropwise over 0.5 hour, in the course of which the reaction mixture is heated to approx. 70° C. The reaction mixture is stirred at 60° C. for a further 5 hours.

Example 1

Tetrapropylenesuccinic Acid N,N-dibutylamino-N-ethyl Ester 87.8 g of tetrapropylenesuccinic anhydride (HN=383.3 mg KOH/g) and 52.0 g of dibutylaminoethanol (DBAE; OHN=323.8 mg KOH/g) were used to obtain 139 g of tetrapropylenesuccinic acid N,N-dibutylamino-N-ethyl ester with AN=133.4 mg KOH/g and bas. N=2.93%.

Example 2

Pentapropylenesuccinic Acid N,N-dibutylamino-N-ethyl Ester 117.4 g of pentapropylenesuccinic anhydride (HN=286.7 mg KOH/g) and 52.0 g of dibutylaminoethanol (DBAE; OHN=323.8 mg KOH/g) were used to obtain 169 g of pentapropylenesuccinic acid N,N-dibutylamino-N-ethyl ester with AN=118.7 mg KOH/g and bas. N=2.45%.

Example 3

Polyisobutenylsuccinic Acid N,N-dibutylamino-N-ethyl Ester 130.5 g of polyisobutenylsuccinic anhydride (based on PIB 550; HN=257.9 mg KOH/g) and 52.0 g of dibutylaminoethanol (DBAE; OHN=323.8 mg KOH/g) were used to obtain 182 g of polyisobutenylsuccinic acid N,N-dibutylamino-N-ethyl ester with AN=106.1 mg KOH/g and bas. N=2.27%.

Example 4

Dodecenyl-/tetradecenylsuccinic Acid N,N-dibutylamino-N-tri(ethoxy)ethyl Ester 84.2 g of dodecenyl-/tetradecenylsuccinic anhydride (HN=399.9 mg KOH/g) and 72.9 g of dibutylamine+3.7 EO (OHN=230.9 mg KOH/g) were used to obtain approx. 155 g of dodecenyl-/tetradecenylsuccinic acid N,N-dibutylamino-N-tri(ethoxy)ethyl ester with AN=106.6 mg KOH/g and bas. N=2.24%.

Example 5

Tripropylenesuccinic Acid N,N-dibutylamino-N-tri(ethoxy)ethyl Ester 74.1 g of tripropylenesuccinic anhydride (HN=454.5 mg KOH/g) and 72.9 g of dibutylamine+3.7 EO (OHN=230.9 mg KOH/g) were used to obtain approx. 145 g of tripropylenesuccinic acid N,N-dibutylamino-N-tri(ethoxy)ethyl ester with AN=123.7 mg KOH/g and bas. N=2.39%.

Example 6

Tetrapropylenesuccinic Acid N,N-dibutylamino-N-tri(ethoxy)ethyl Ester 87.8 g of tetrapropylenesuccinic anhydride (HN=383.3 mg KOH/g) and 72.9 g of dibutylamine+3.7 EO (OHN=230.9 mg KOH/g) were used to obtain approx. 160 g of tetrapropylenesuccinic acid N,N-dibutylamino-N-tri(ethoxy)ethyl ester with AN=115.6 mg KOH/g and bas. N=2.18%.

Example 7

Pentapropylenesuccinic Acid N,N-dibutylamino-N-tri(ethoxy)ethyl Ester 102.8 g of pentapropylenesuccinic anhydride (HN=327.6 mg KOH/g) and 72.9 g of dibutylamine+3.7 EO (OHN=230.9 mg KOH/g) were used to obtain approx. 175 g of pentapropylenesuccinic acid N,N-dibutylamino-N-tri(ethoxy)ethyl ester with AN=100.5 mg KOH/g and bas. N=2.00%.

Example 8

Polyisobutenylsuccinic Acid N,N-dibutylamino-N-tri(ethoxy)ethyl Ester 130.5 g of polyisobutenylsuccinic anhydride (based on PIB 550; HN=257.9 mg KOH/g) and 72.9 g of dibutylamine+3.7 EO (OHN=230.9 mg KOH/g) were used to obtain approx. 200 g of polyisobutenylsuccinic acid N,N-dibutylamino-N-tri(ethoxy)ethyl ester with AN=90.8 mg KOH/g and bas. N=1.74%.

b) General Method for the Preparation of Alkenylsuccinic Acid Alkyl/alkoxy Monoesters with Alkanolamines A stirred apparatus is initially charged with 1 mol (according to bas. N) of the appropriate alkenylsuccinic acid alkyl/alkoxy monoester with nitrogen purging and heated to 60° C. 1 mol of alkanolamine is added dropwise thereto at such a rate that the reaction temperature does not exceed 80 to 90° C. The reaction mixture is subsequently stirred at 80° C. for a further 3 hours.

Example 9

Tetrapropylenesuccinic Acid N,N-dibutylamino-N-ethyl Ester Monoethanolamine Salt 139 g of tetrapropylenesuccinic acid N,N-dibutylamino-N-ethyl ester and 20.1 g of monoethanolamine were used to obtain 159.1 g of tetrapropylenesuccinic acid N,N-dibutylamino-N-ethyl ester monoethanolamine salt with AN=115.2 mg KOH/g and bas. N=5.76%.

Example 10

Tetrapropylenesuccinic Acid N,N-dibutylamino-N-ethyl Ester Diethanolamine Salt 139 g of tetrapropylenesuccinic acid N,N-dibutylamino-N-ethyl ester and 34.7 g of diethanolamine were used to obtain 173.7 g of tetrapropylenesuccinic acid N,N-dibutylamino-N-ethyl ester diethanolamine salt with AN=106.2 mg KOH/g and bas. N=5.58%.

Example 11

Tetrapropylenesuccinic Acid N,N-dibutylamino-N-ethyl Ester Triethanolamine Salt 139 g of tetrapropylenesuccinic acid N,N-dibutylamino-N-ethyl ester and 49.2 g of triethanolamine were used to obtain 188.2 g of tetrapropylenesuccinic acid N,N-dibutylamino-N-ethyl ester triethanolamine salt with AN=98.3 mg KOH/g and bas. N=5.34%.

Example 12

Tetrapropylenesuccinic Acid N,N-dibutylamino-N-ethyl Ester Alkanolamine Salt 139 g of tetrapropylenesuccinic acid N,N-dibutylamino-N-ethyl ester and a mixture of 6.7 g of monoethanolamine, 11.6 g of diethanolamine and 16.4 g of triethanolamine were used to obtain 173.7 g of tetrapropylenesuccinic acid N,N-dibutylamino-N-ethyl ester alkanolamine salt with AN=106.1 mg KOH/g and bas. N=5.54%.

Example 13

Dodecenyl-/tetradecenylsuccinic Acid N,N-dibutylamino-N-tri(ethoxy)ethyl Ester Triethanolamine Salt 155 g of dodecenyl-/tetradecenylsuccinic acid N,N-dibutylamino-N-tri(ethoxy)ethyl ester and 37 g of triethanolamine were used to obtain approx. 192 g of dodecenyl-/tetradecenylsuccinic acid N,N-dibutyl-amino-N-tri(ethoxy)ethyl ester triethanolamine salt with AN=84.8 mg KOH/g and bas. N=4.03%.

Example 14

Tripropylenesuccinic Acid N,N-dibutylamino-N-tri(ethoxy)ethyl Ester Triethanolamine Salt 145 g of tripropylenesuccinic acid N,N-dibutylamino-N-tri(ethoxy)ethyl ester and 37 g of triethanolamine were used to obtain approx. 182 g of tripropylenesuccinic acid N,N-dibutylamino-N-tri(ethoxy)ethyl ester triethanolamine salt with AN=99.7 mg KOH/g and bas. N=4.19%.

Example 15

Tetrapropylenesuccinic Acid N,N-dibutylamino-N-tri(ethoxy)ethyl Ester Triethanolamine Salt 160 g of tetrapropylenesuccinic acid N,N-dibutylamino-N-tri(ethoxy)ethyl ester and 37 g of triethanolamine were used to obtain approx. 197 g of tetrapropylenesuccinic acid N,N-dibutylamino-N-tri(ethoxy)ethyl ester triethanolamine salt with AN=93.9 mg KOH/g and bas. N=3.98%.

Example 16

Pentapropylenesuccinic Acid N,N-dibutylamino-N-tri(ethoxy)ethyl Ester Triethanolamine Salt 175 g of pentapropylenesuccinic acid N,N-dibutylamino-N-tri(ethoxy)ethyl ester and 37 g of triethanolamine were used to obtain approx. 212 g of pentapropylenesuccinic acid N,N-dibutylamino-N-tri(ethoxy)ethyl ester triethanolamine salt with AN=83.2 mg KOH/g and bas. N=3.79%.

Example 17

Polyisobutenylsuccinic Acid N,N-dibutylamino-N-tri(ethoxy)ethyl Ester Triethanolamine Salt 200 g of polyisobutenylsuccinic acid N,N-dibutylamino-N-tri(ethoxy)ethyl ester and 37 g of triethanolamine were used to obtain approx. 237 g of polyisobutenylsuccinic acid N,N-dibutylamino-N-tri(ethoxy)ethyl ester triethanolamine salt with AN=76.3 mg KOH/g and bas. N=3.13%.

Effectiveness of the Inventive Compounds as Corrosion Inhibitors

The inventive compounds were tested as corrosion inhibitors in the Shell wheel test. Coupons of carbon steel (DIN 1.1203 with surface area 15 cm$^2$) were immersed into a salt water/petroleum mixture (9:1.5% NaCl solution adjusted to pH 3.5 with acetic acid) and exposed to this medium at a rotational speed of 40 rpm at 70° C. for 24 hours. The dosage of the inhibitor was 50 ppm of a 40% solution of the inhibitor. The protection values were calculated from the mass decrease of the coupons based on a blank value.

In the tables which follow, "comparison 1" denotes a commercial residue amine—quat based on dicocoalkyldimethylammonium chloride—and "comparison 2" a commercial soybean fatty acid amidopropyl-N,N-dimethylammonium carboxymethyl betaine described by EP-B-0 446 616 (prior art corrosion inhibitors).

TABLE 1

(SHELL wheel test)

| Example | Corrosion inhibitor | ø Protection % |
|---|---|---|
| Comparison 1 | Standard quat | 36.0 |
| Comparison 2 | Standard betaine | 75.4 |
| 18 | Compound from example 2 | 79.3 |
| 19 | Compound from example 4 | 78.4 |
| 20 | Compound from example 7 | 81.3 |
| 21 | Compound from example 11 | 88.7 |

TABLE 1-continued (SHELL wheel test)

| Example | Corrosion inhibitor | ø Protection % |
|---|---|---|
| 22 | Compound from example 13 | 89.3 |
| 23 | Compound from example 16 | 88.5 |

The products were also tested in the LPR test (test conditions analogous to ASTM D 2776).

TABLE 2

(LPR test)

| | | Protection after [%] | |
|---|---|---|---|---|
| Example | Corrosion inhibitor | 10 min | 30 min | 60 min |
| Comparison 1 | Standard quat | 53.9 | 61.2 | 73.7 |
| Comparison 2 | Standard betaine | 45.9 | 59.2 | 64.3 |
| 18 | Compound from example 2 | 50.3 | 65.7 | 79.3 |
| 19 | Compound from example 4 | 52.4 | 66.8 | 78.8 |
| 20 | Compound from example 7 | 55.8 | 70.1 | 83.5 |
| 21 | Compound from example 11 | 77.1 | 89.0 | 96.8 |
| 22 | Compound from example 13 | 78.3 | 88.1 | 94.2 |
| 23 | Compound from example 16 | 80.5 | 91.2 | 97.6 |

As can be seen from the above test results, the inventive products have very good corrosion protection properties at low dosage and significantly exceed the effectiveness of the prior art inhibitors.

TABLE 3

Biodegradability (OECD 306)

| Example | Corrosion inhibitor | Biodegradability [%] |
|---|---|---|
| Comparison 3 | Compound from example 4, quaternized | 18.6 |
| Comparison 4 | Compound from example 7, quaternized | 16.7 |
| 24 | Compound from example 13 | 81.5 |
| 25 | Compound from example 16 | 85.4 |

As is clearly evident from table 3, the unquaternized compounds exhibit better biodegradability than the comparable quaternized compounds, for which the reason lies in the absence of the toxic "quat structural element".

The invention claimed is:

1. A method for inhibiting gas hydrate formation and inhibiting corrosion on and in equipment for processing and transporting hydrocarbons, said method comprising adding to the hydrocarbons a compound of formula (1)

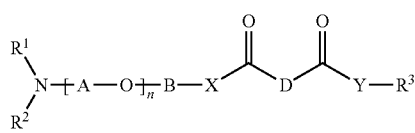

(1)

in which
R$^1$, R$^2$ are each independently C$_1$- to C$_{22}$-alkyl, C$_2$- to C$_{22}$-alkenyl, C$_6$- to C$_{30}$-aryl or C$_7$- to C$_{30}$-alkylaryl, and
R$^3$ is M, hydrogen or an organic radical which may contain heteroatoms and has from 1 to 100 carbon atoms,
A is a C$_2$- to C$_4$-alkylene group,
B is an optionally substituted C$_1$- to C$_{10}$-alkylene group,
D is an ethylene group substituted by an organic radical having from 1 to 600 carbon atoms,
X, Y are each independently O or NR$^4$,
R$^4$ are each independently hydrogen, C$_1$- to C$_{22}$-alkyl, C$_2$- to C$_{22}$-alkenyl, C$_6$- to C$_{30}$-aryl or C$_7$- to C$_{30}$-alkylaryl, and
M is a cation, and
n is from 0 to 30.

2. The method of claim 1, where A is an ethylene, propylene or butylene group.

3. The method of claim 1, where B is a C$_2$- to C$_4$-alkylene group and is optionally substituted by a functional group.

4. The method of claim 1, where R$^1$ and R$^2$ are each independently an alkyl or alkenyl group of from 2 to 14 carbon atoms.

5. The method of claim 1, where R$^4$ is hydrogen.

6. The method of claim 1, where n is from 1 to 10.

7. The method of claim 1, where R$^3$ is a radical of the formula (2)

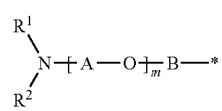

(2)

in which
R$^1$, R$^2$ are each independently C$_1$- to C$_{22}$-alkyl, C$_2$- to C$_{22}$-alkenyl, C$_6$- to C$_{30}$ or C$_7$- to C$_{30}$-alkylaryl, and
A is a C$_2$- to C$_4$-alkylene group,
B is an optionally substituted C$_1$- to C$_{10}$-alkylene group, and m, independently of n, is from 0 to 30.

8. The method of claim 1, where D is a structural unit of the formula

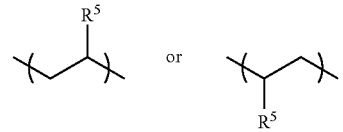

in which R$^5$ is a C$_2$- to C$_{100}$-alkyl or -alkenyl radical.

9. The method of claim 8, where R$^5$ represents a structural unit of the formula (3)

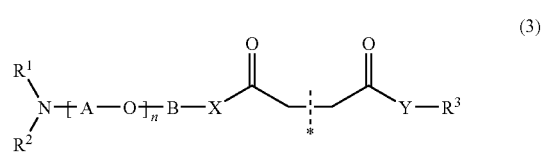

(3)

in which R$^1$, R$^2$ are each independently C$_1$- to C$_{22}$-alkyl, C$_2$- to C$_{22}$-alkenyl, C$_6$- to C$_{30}$-aryl or C$_7$- to C$_{30}$-alkylaryl, and
R$^3$ is M, hydrogen or an organic radical which may contain heteroatoms and has from 1 to 100 carbon atoms,
R$^4$ are each independently hydrogen, C$_1$- to C$_{22}$-alkyl, C$_2$- to C$_{22}$-alkenyl, C$_6$- to C$_{30}$-aryl or C$_7$- to C$_{30}$-alkylaryl, and
A is a C$_2$- to C$_4$-alkylene group,
B is an optionally substituted C$_1$- to C$_{10}$-alkylene group,
X, Y are each independently O or NR$^4$, and n is from 0 to 30, M is a cation, and wherein the dotted line with asterisk denotes that the structure unit of formula (3) may be bonded in the 2- or 3-position of its dicarbonyl groups to any position of $R^5$ by a bonding site of this alkyl or alkenyl group.

10. The method of claim 1, where D together with the carbonyl groups to which it is bonded, is derived from a substituted succinic acid derivative having from 10 to 100 carbon atoms.

11. The method of claim 1, in which $R^3$=M and M is an ammonium ion of the formula $N^+HR^6R^7R^8$, and where one, two or all $R^6$, $R^7$ and $R^8$ radicals are —$CH_2$—$CH_2$—OH and the remaining radicals are each H.

12. The method of claim 1, wherein B is ethylene or propylene.

13. The method of claim 1, wherein B is a $C_2$- to $C_4$-alkylene and is optionally substituted with at least one OH group.

* * * * *